US011481141B1

(12) United States Patent
Cariello (10) Patent No.: US 11,481,141 B1
(45) Date of Patent: Oct. 25, 2022

(54) SECURE SELF-PURGING MEMORY PARTITIONS

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/240,940

(22) Filed: Apr. 26, 2021

(51) Int. Cl.
*G06F 12/00* (2006.01)
*G06F 3/06* (2006.01)

(52) U.S. Cl.
CPC .......... *G06F 3/0652* (2013.01); *G06F 3/0604* (2013.01); *G06F 3/0644* (2013.01); *G06F 3/0679* (2013.01)

(58) Field of Classification Search
CPC .... G06F 3/0652; G06F 3/0604; G06F 3/0644; G06F 3/0679
See application file for complete search history.

(56) References Cited

U.S. PATENT DOCUMENTS

| | | | | |
|---|---|---|---|---|
| 9,015,401 | B2* | 4/2015 | Hars | G06F 12/0246 |
| | | | | 711/103 |
| 11,175,839 | B1* | 11/2021 | Volpe | G06F 3/0679 |
| 2015/0262628 | A1* | 9/2015 | Pio | G11C 29/028 |
| | | | | 711/103 |
| 2020/0104514 | A1* | 4/2020 | Wong | G06F 21/79 |
| 2021/0034547 | A1* | 2/2021 | Riley | G06F 12/1483 |
| 2021/0073131 | A1* | 3/2021 | Krueger | G06F 9/45558 |
| 2021/0103915 | A1* | 4/2021 | Top | G06F 3/0679 |
| 2021/0208924 | A1* | 7/2021 | Krueger | G06F 9/467 |
| 2021/0311828 | A1* | 10/2021 | Cariello | G06F 11/1068 |
| 2022/0004325 | A1* | 1/2022 | Amato | G06F 3/0655 |

* cited by examiner

*Primary Examiner* — John A Lane
(74) *Attorney, Agent, or Firm* — Holland & Hart LLP (57) ABSTRACT

Methods, systems, and devices for secure self-purging memory partitions are described. Systems, techniques and devices are described herein in which data stored in a portion of a secure partition of memory may be removed from the secure partition. In some examples, a portion of secure partition may be allocated as self-purging memory such that data stored therein may be selectively removed in response to a logic address associated with the data being overwritten. In some cases, the data may be removed by programming the memory cells associated with the data to a specific voltage distribution. In some cases, the secure partition may include separate portions having different sets of operating parameters for access operations.

25 Claims, 5 Drawing Sheets

SECURE SELF-PURGING MEMORY PARTITIONS

FIELD OF TECHNOLOGY

The following relates generally to one or more systems for memory and more specifically to secure self-purging memory partitions.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

A memory system may include one or more portions configured to store data securely (e.g., more securely than other portions of the memory system configured to store data). For example, the memory system may include a Replay Protected Memory Block (RPMB) configured to store data securely. Data written to and read from the RPMB may be authenticated (using HMAC signature and secret shared key) to prevent tampering. Some systems may store in the RPMB block cryptographic keys used for secure communication or other purposes. In some instances, when those keys or other secure data stored within the RPMB are no more valid, it may be desirable to physically erase them, for example to prevent the information from being used to attack the security system. In other examples the encryption keys or secure data may be stored in another portion of the memory device with no particular security feature (e.g. in a Normal Logic Unit).

Many security applications desire a removal of cryptographic keys from physical memory after the keys are used (e.g., RPMB). With block memory devices, logical addresses are commonly used to identify a memory portion and its contents. In such systems, a cryptographic key may be associated with a logical address, which may store the key in a physical location of memory. To remove the cryptographic key, the logical address associated with the key may be overwritten. But in some examples, overwriting a logical address may cause the logical address to become associated with a different physical location of memory but not remove data from the initial physical location. So in these systems, the original cryptographic key may not be removed from the initial physical memory until a physical removal (e.g., a purge operation) is performed. Performing a purge operation on a memory system may be inefficient and time-consuming and increase wear-out of the memory cells, making it difficult, if not impossible, to perform it often, and thus increasing the exposure of the deleted security content.

Systems, devices, and techniques for a memory in which keys and other data may be selectively or automatically removed from their locations in physical memory after being used. Systems, devices, and techniques are described herein in which data stored in a portion of physical memory may be removed from a secure partition of the memory (e.g., removed from the RPMB). In some examples, a portion of the secure partition of memory may be allocated as self-purging memory such that data stored therein may be selectively removed in response to a logic address associated with the data being overwritten. In some cases, the data may be removed by programming some or all of the memory cells associated with the data to a same voltage distribution. In some cases, the secure partition may include separate portions having different sets of operating parameters for access operations. In some cases, the secure partition may be an example of an RPMB.

Features of the disclosure are initially described in the context of systems and devices as described with reference to FIGS. 1 and 2. Features of the disclosure are further described in the context of distribution plots as described with reference to FIGS. 3-4C. These and other features of the disclosure are further illustrated by and described with reference to an apparatus diagram and a flowchart that relate to secure self-purging memory partitions as described with reference to FIGS. 5-6.

Figure 1:
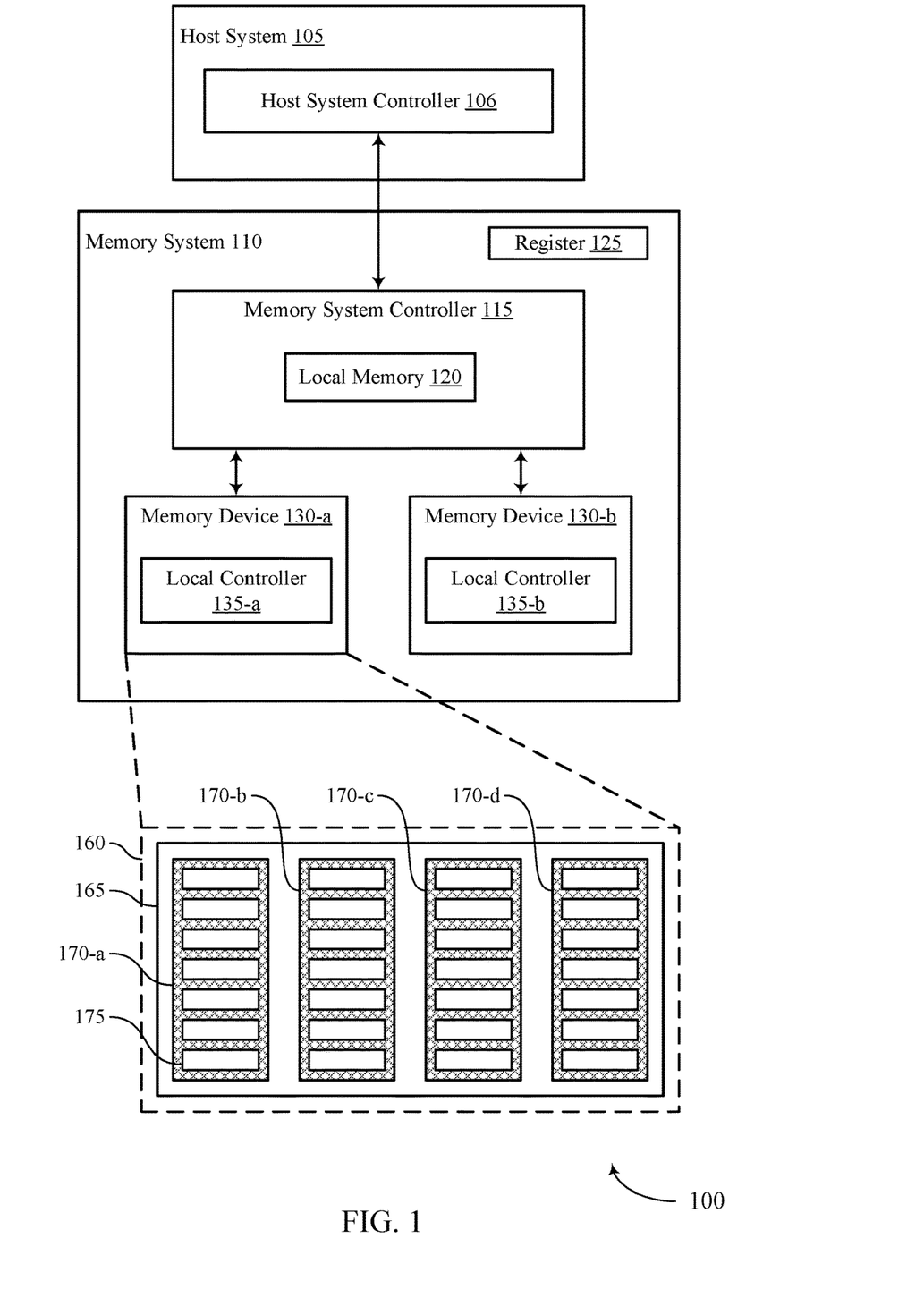
FIG. 1 illustrates an example of a system that supports secure self-purging memory partitions in accordance with examples as disclosed herein.

FIG. 1 illustrates an example of a system 100 that supports secure self-purging memory partitions in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as disclosed herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110. The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random-access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 (e.g., blocks 170-a, 170-b, 170-c, and 170-d), and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may not be rewritten with new data until after they have been erased. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be instead of erasing and rewriting the entire old block 170 due to latency or wear-out considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, a memory system controller 115 or a local controller 135 may perform operations (e.g., as part of one or more media management algorithms) for a memory device 130, such as wear leveling, background refresh, purge, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support secure self-purging memory partitions. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some instances, it may be desired to erase data stored in a secure partition of a memory system (e.g., remove data from an RPMB). To access the data, a logical block address currently associated with the physical location may be used. To erase the original data, an unmap command may be transmitted from the host system 105 to the memory system to indicate that the data stored at the associated logical block address is invalid. This may signal that new data may be stored there, but may not cause the original data to be erased from the original physical location, which may be concerning if using some types of data, such as sensitive personal information or security data (e.g., encryption keys). To erase the original data from the original physical location, one of the operations discussed above (e.g., purge, garbage collection, scrub) may be performed on the secure partition of memory. This may be inefficient and time consuming. It may also increase wear-out of the memory cells.

In some cases, a limited quantity of logical addresses of the secure partition (e.g., RPMB) may be allocated to store secure information in a manner that is erasable under certain conditions. Writing to these logical block addresses may cause the data associated with the write command to be stored in the dedicated portion. Reading from these logical addresses may cause data to be retrieved from the dedicated portion. In some cases, the data may be removed from the dedicated portion using some commands.

Figure 2:
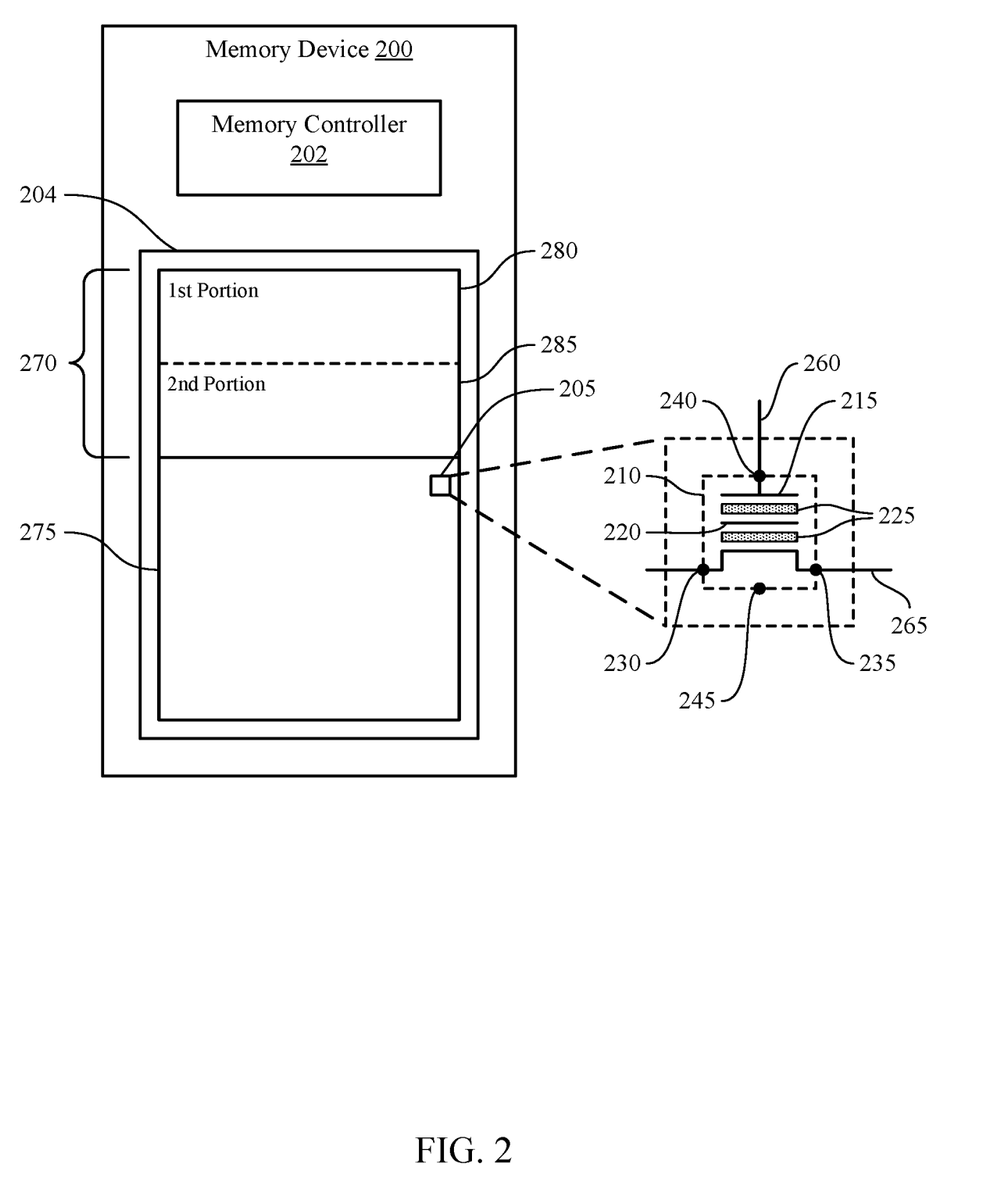
FIG. 2 illustrates an example of a memory device that supports secure self-purging memory partitions in accordance with examples as disclosed herein.

FIG. 2 illustrates an example of a memory device 200 that supports secure self-purging memory partitions in accordance with examples as disclosed herein. Memory device 200 may be an example of a memory device 130. The memory device 200 may include a memory controller 202 which may execute operations on one or more memory cells 205 of the memory device 200. Memory controller 202 may be an example of a local controller 135 discussed with reference to FIG. 1.

A memory cell 205 may be, for example, a flash or other type of NAND memory cell. Each memory cell 205 may include a transistor that has a charge trapping structure (e.g., a floating gate, a replacement gate, or a dielectric material) for storing an amount of charge representative of a logic value. For example, the blow-up in FIG. 2 illustrates a NAND memory cell 205 that includes a transistor 210 (e.g., a metal-oxide-semiconductor (MOS) transistor) that may be used to store a logic value. The transistor 210 may have a control gate 215 and may also include a charge trapping structure 220 (e.g., a floating gate or a replacement gate). The charge trapping structure 220 may be sandwiched between two portions of dielectric material 225. The transistor 210 may include a first node 230 (e.g., a source or drain) and a second node 235 (e.g., a drain or source).

A logic value may be stored in the transistor 210 by placing (e.g., writing, storing) a quantity of electrons (e.g., an amount of charge) on the charge trapping structure 220. The amount of charge to be stored on the charge trapping structure 220 may depend on the logic value to be stored. The charge stored on the charge trapping structure 220 may affect the threshold voltage of the transistor 210, thereby affecting the amount of current that may flow through the transistor 210 upon the transistor 210 being activated (e.g., upon a voltage being applied to the control gate 215).

Data may be stored in the form of a threshold voltage of transistor 210 (i.e., the voltage at which transistor 210 turns on). Thus, an SLC memory cell 205 may be written by applying one of two voltages (e.g., a voltage above the threshold or a voltage below the threshold) to the memory cell 205 to store, or not store, an electric charge on the charge trapping structure 220 and thereby cause the memory cell 205 to store one of two possible logic values.

Storing an electric charge on the charge trapping structure 220 may be referred to as programing the memory cell 205 and may occur as part of a program operation. A programmed memory cell may, in some cases, be considered as storing a logic 0. Removal of the electric charge from the charge trapping structure 220 may be referred to as erasing the memory cell 205 and may occur as part of an erase operation. An erased memory cell may, in some cases, be considered as storing a logic 1. A logic value stored in the transistor 210 may be sensed (e.g., as part of a read operation) by applying a voltage to the control gate 215 (e.g., to the control node 240 via a word line 260) to activate transistor 210 and measuring (e.g., detecting, sensing) the resulting amount of current that flows through the first node 230 or the second node 235 (e.g., via a digit line 265). For example, a sense component may determine whether an SLC memory cell 205 stores a logic 0 or a logic 1 in a binary manner (e.g., based on a presence or absence of a current through memory cell 205 in response to a read voltage being applied to the control gate 215, or based on whether the current is above or below the threshold current).

The memory device 200 may include a memory array 204 that includes a plurality of memory cells (e.g., memory cells 205). The memory array 204 may include one or more partitions. For example, the memory array may include a first partition 270 and a second partition 275. A limited quantity of logical addresses may be associated with the first partition 270 such that the logical addresses may use the first partition 270 for reading and writing data. Writing to these logical addresses may cause the data associated with the write command to be physically stored in the first partition 270. Reading from the logical addresses may cause data to be retrieved from the first partition 270. In some cases, after the data is read, it may be automatically removed from the first partition 270. In some cases, the data may be automatically removed in response to the logical address being overwritten (i.e., the logical address becoming associated with a different physical location of the first partition).

The first partition 270 may be a secure partition 270 configured to store data for authenticated systems and the second partition 275 may be a nonsecure partition 275. In some examples, the first partition 270 may be an example of an RPMB. The partitions may be separate entities or portions of the same memory. Each partition may include memory cells (e.g., memory cells 205) in one or more regions (e.g., one or more blocks 170, pages 175, or other regions of memory cells of memory device 200), each configured to store data. In some cases, a partition (e.g., a secure or enhanced partition 270) may be configured to store data more securely and reliably compared to one or more nonsecure partitions (e.g., nonsecure partition 275) at the memory device 200. For example, blocks 170 associated with secure partition 270 may include SLCs, which may be generally more reliable compared to other types of memory cells.

In some cases, the secure partition 270 (e.g., RPMB) or one or more portions thereof (e.g., first portion 280 or second portion 285) may perform an authentication before storing or accessing information. For example, the memory system may utilize one or more keys (e.g., RPMB authentication keys) to access data stored at the secure partition 270. In some cases, the secure partition 270 or one or more portions thereof may not be capable of being accessed using a standard command protocol, but rather may be accessed using a unique command protocol (e.g., an RPMB protocol) that enhances the security of the secure partition 270 or one or more portions thereof. The secure partition 270 or one or more portions thereof may provide authenticated and replay protected access to sensitive information stored thereon. In some examples, the protocol associated with secure partition 270 or one or more portions thereof (e.g., the keys used to write and read the secure partition) may mitigate risks associated with replay attacks, as compared with standard memory (e.g., nonsecure partition 275).

In some cases, the secure partition 270 or one or more portions thereof may be configured to store data such as encryption keys. For example, the secure partition 270 or one or more portions thereof may store encryption keys associated with other data stored at the memory system 110 or used by the host system 105 for other purposes (e.g. to secure communication with other systems). For example, a block of secure partition 270 (e.g., an RPMB) may store an encryption key for encrypting and decrypting data stored on another block of the memory device 200. In some cases, the encryption keys may be derived from a hardware unique key (e.g., associated with the memory system 110). Additionally, the data may be associated with an application that uses encrypted data; a user of the application may have user credentials and the encryption keys may be associated with the user credentials.

The secure partition 270 may include one or more portions, each configurable with different sets of operating parameters. For example, the secure partition 270 may include a first portion 280 having a first set of operating parameters for access operations and a second portion 285 having a second set of operating parameters for access operations different than the first set. The first portion 280 may be example of a portion that uses RPMB protocols to store and access information. The second portion 285 may use different protocols to store secure information in a manner that allows some of the information to be erased. The sets of operating parameters may be included in trim parameters stored for each portion. In some cases, the secure partition 270 or a portion thereof (e.g., first portion 280 or second portion 285) may be an example or an RPMB or include one or more RPMBs.

In some cases, the secure partition 270 or one or more portions thereof may use symmetric key authentication, in which that same authentication key is used by both the host and the device (e.g., a shared-secret key). In some cases, the secure partition 270 or one or more portions thereof may use a counter (e.g., an RPMB counter) as part of an authentication. The counter may be associated with the secure partition and be configured to reduce a likelihood of success of a replay attack applied to data stored in the secure partition. In some cases, the counter may be incremented after every write message to the secure partition 270 or one or more portions thereof and the counter's new value may be included in a calculation of a next authentication code to be used.

In some cases, data stored in at least one of the portions (e.g., portion the secure partition 270 may be removable from the secure partition 270. This may be especially useful for some types of data, such as sensitive data (e.g., personal information) or security data (e.g., encryption keys). In some cases, removal of the data may be triggered by overwriting the logical block address associated with the physical location where the data is stored. To perform an overwrite, a write command may be transmitted from the host system 105 to the associated logical block address (e.g., via the memory system controller 115) to write new data thereto. This may trigger a removal of the original data from the original physical location in the secure partition 270 in a manner discussed herein. It may also cause the logical block address to become associated with a different physical location of the secure partition 270 and the new data may be physically stored there.

Figure 3:
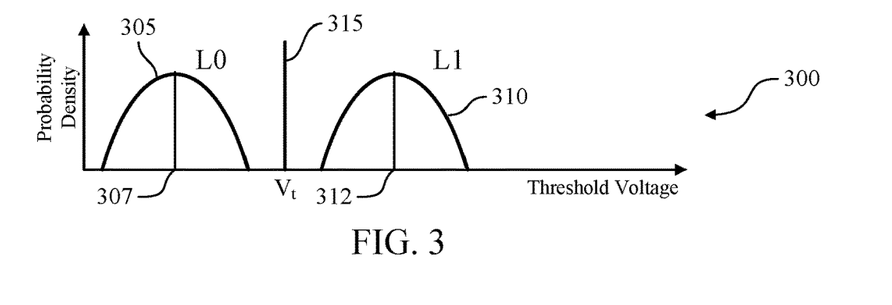
FIGS. 3, 4A, 4B and 4C show example distribution plots that support secure self-purging memory partitions in accordance with examples as disclosed herein.

FIG. 3 illustrates an example of a distribution plot 300 that supports secure self-purging memory partitions in accordance with examples as disclosed herein. The distribution plot 300 may illustrate example distributions of an SLC as disclosed herein. In some cases, distribution plot 300 may be associated with a first portion of memory (e.g., first portion 280 of secure partition 270) according to examples herein.

To reflect a data bit being stored, a memory cell's state (e.g., charge) may be programmed to a corresponding voltage level. For example, to program a memory cell of the first portion of memory to a logic 1 or 0 state, charge pulses may be applied to the memory cell during write operations, moving its threshold from a first write voltage 307 (a.k.a. erased level) to a second write voltage 312 (a.k.a. programmed level.

Ideally, the threshold voltages of a memory cell would correspond to the write voltages. However, due to variation during programming and other disturbances after writing, the threshold voltage of cells programmed to the same state may be distributed across a voltage window for the state. This may result in a threshold voltage distribution of memory cells across a voltage range for each state. For example, for the first portion of memory, a cell storing a logic 1 may have a threshold voltage anywhere in the L0 voltage distribution 305 and a cell storing a logic 0 may have a threshold voltage anywhere in the L1 voltage distribution 310. L0 and L1 may be referred to as the states of the cells.

During a read operation of a memory cell, a charge of the memory cell may be compared with a read reference voltage. For example, to determine the logic values stored by one or more memory cells of the portion of memory, a memory device may apply a read reference voltage 315 to one or more memory cells to read a page of data stored by the one or more memory cells. For memory cells whose threshold voltage is above the reference voltage (e.g., to the right of read reference voltage 315), current may flow from the memory cell after applying the read reference voltage 315 to the memory cell, signifying a logic value '0'. In contrast, for memory cells having a charge below the reference voltage (e.g., to the left of read reference voltage 315) current may not flow from the memory cell after applying the read reference voltage 315 to the memory cell, signifying a logic value '1'. To make sure the memory cells are read correctly, the read reference voltage 315 may be between the L0 distribution 305 and the L1 distribution 310, as shown in FIG. 3. The system may have a read window budget equal to the voltage difference between the L0 distribution 305 and the L1 distribution 310, in some cases.

The first write voltage 307 associated with the L0 state, the second write voltage 312 associated with the L1 state, the read reference voltage 315, or any combination thereof, may be part of a first set of operating parameters for access operations of the first portion of memory and may be stored as trim parameters.

Figure 4A:
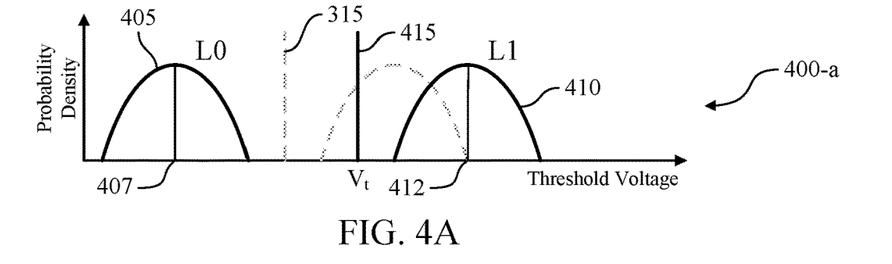
Figure 4B:
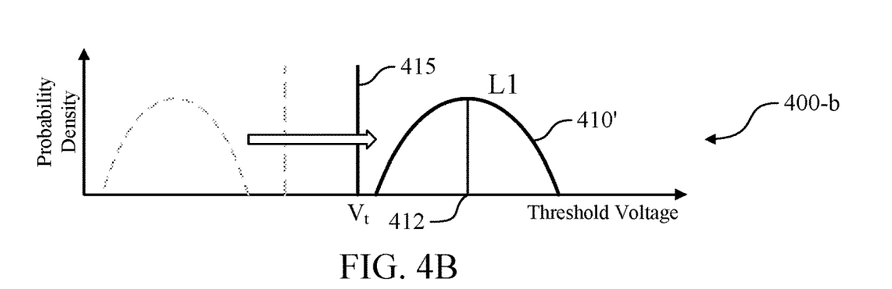
Figure 4C:
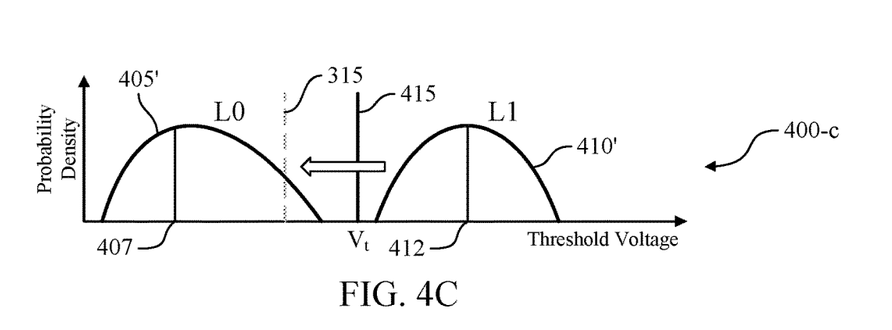

FIGS. 4A-4C illustrate examples of distribution plots 400 (400-a, 400-b, 400-c) that support secure self-purging memory partitions in accordance with examples as disclosed herein. The distribution plots 400 may illustrate example distributions of an SLC as described herein. In some cases, the distribution plots 400 may be associated with a second portion of memory (e.g., second portion 285 of secure partition 270) according to examples herein. The second portion of memory (e.g., second portion 285 of secure partition 270) may be different than the first portion of memory (e.g., first portion 280 of secure partition 270). The different operating parameters used for the second portion 285 of the secure partition 270 may enable the data stored in the second portion 285 to be erased using a first set of conditions while data stored in the first portion 280 of the secure partition 270 may not be erasable under the first set of conditions.

Similar to distribution plot 300, distribution plot 400-a in FIG. 4A may also include an L0 voltage distribution 405 based on a first write voltage 407, and an L1 voltage distribution 410 based on a second write voltage 412. But with respect to distribution plot 300, the second write voltage 412 associated with the L1 state may be moved to a higher voltage level and thereby cause the L1 voltage distribution 410 to also be higher. That is, the second write voltage 412 used to write the L1 logic state of a memory cell associated with the second portion of memory may be different (e.g., greater) than the second write voltage 312 used to write the L1 logic state of a memory cell associated with the first portion of memory. To attain the higher second write voltage 412, more and/or stronger charge pulses may be applied during write operations.

Because of the greater second write voltage 412, the voltage distribution level for memory cells storing the L1 logic state associated with the second portion of memory may be different (e.g., higher) than the voltage distribution level for memory cells storing the L1 logic state associated with the first portion of memory. The higher L1 voltage distribution 410 may result in a larger read window budget for the second portion 285 of memory. As a result, the read reference voltage 415 for the second portion of memory may be moved to a higher voltage level with respect to the read reference voltage 315 of the first portion of memory to allow more variation in the L0 voltage distribution. Thus, during a read operation of a memory cell associated with the second portion of memory, a charge of the memory cell may be compared with a read reference voltage (e.g., read reference voltage 415) that is different (e.g., higher) than the read reference voltage (e.g., read reference voltage 315) used to compare the charges of the memory cells associated with the first portion of memory.

The first write voltage 407 (which in some cases may be equal to the first write voltage 307), the second write voltage 412, the read reference voltage 415, or any combination thereof, may be part of a second set of operating parameters for access operations of the second portion 285 of memory and may be stored as trim parameters.

After storing data to one or more cells of the second portion of memory (e.g., the second portion 285 of secure partition 270), it may be desired to remove the data from the cells. For example, it may be desired to remove an authorization key from the second portion 285 of secure partition 270 after using the key. As discussed above, one manner of removing data may be accomplished by performing a purge or other similar operation, which may cause the charge on the memory cells to be removed, moving the L1 cells to the L0 distribution state. But doing this has significant downsides because an erase may be performed at a block granularity, it may be inefficient, or it may be time consuming. It may also increase wear-out of the affected memory cells.

In some cases, an alternative manner of removing data from the memory cells may be used. Removing data from memory may broadly mean changing the states of the corresponding memory cells to be unable to determine what data was stored there previously. Erasing the memory cells may be one way to do this. Removing data from memory may alternatively be accomplished by causing the cells to settle at a same state so that it may be highly unlikely to be able to determine what the previous data was. For example, it may be possible to remove data by causing the cells to settle at the L1 state. To do this, charge may be added to the cells in the L0 state to move the L0 cells to the L1 state. Because the cells may then be in the L1 state, any data that was previously stored in the cells may be unknown. This may effectively remove the data from the cells. FIG. 4B illustrates an example distribution plot 400-b of the second portion 285 of secure partition 270 after the cells have been moved to the L1 voltage distribution 410'. Due to programming variations in moving the L0 cells, the L1 voltage distribution 410' may cover a larger voltage range than the L1 voltage distribution 410 was before moving the cells to the L1 state.

In some cases, this alternative manner of removing data may be selectively or automatically performed. For example, this manner of removing data from a physical location of the second portion 285 of secure partition 270 may be triggered by overwriting the logical block address associated with the physical location. In another example, it may be triggered by reading the logical block address associated with the physical location.

After the data has been removed from the memory cells (e.g., the memory cells have been moved to the L1 state), it may be desired to re-program (e.g., rewrite or overwrite) the cells with new data. This may be done by moving some cells from the L1 voltage distribution 410' to the L0 voltage distribution 405' for cells corresponding to a logic 1, using the first write voltage 407. In some cases, the first write voltage 407 of the second portion of memory may be the same as the first write voltage 307 of the first portion of memory. Because cells corresponding to a logic 0 may already be in the L1 distribution 410', those cells may not be reprogrammed. FIG. 4C illustrates an example distribution plot 400-c for the second portion of memory after the cells have been reprogrammed with new data. Due to programming variations in moving some of the L1 cells to the L0 state, the L0 voltage distribution 405' may cover a larger voltage range than the L0 voltage distribution 405 was before moving the cells to the L1 state—large enough to possibly cross over the read reference voltage 315 of the first portion of memory. But because the read reference voltage 415 may be at a higher voltage than read reference voltage 315, the L0 cells of the second portion of memory may still be readable using the read reference voltage 415. Using different operating parameters (e.g., higher write voltage for L1 state and higher read reference voltage state), the cells in the second portion 285 of the secure partition may be erasable and reprogrammable, whereas if the operating parameters for the first portion 280 are used, the data may not be erasable or may not be re-programmable.

Figure 5:
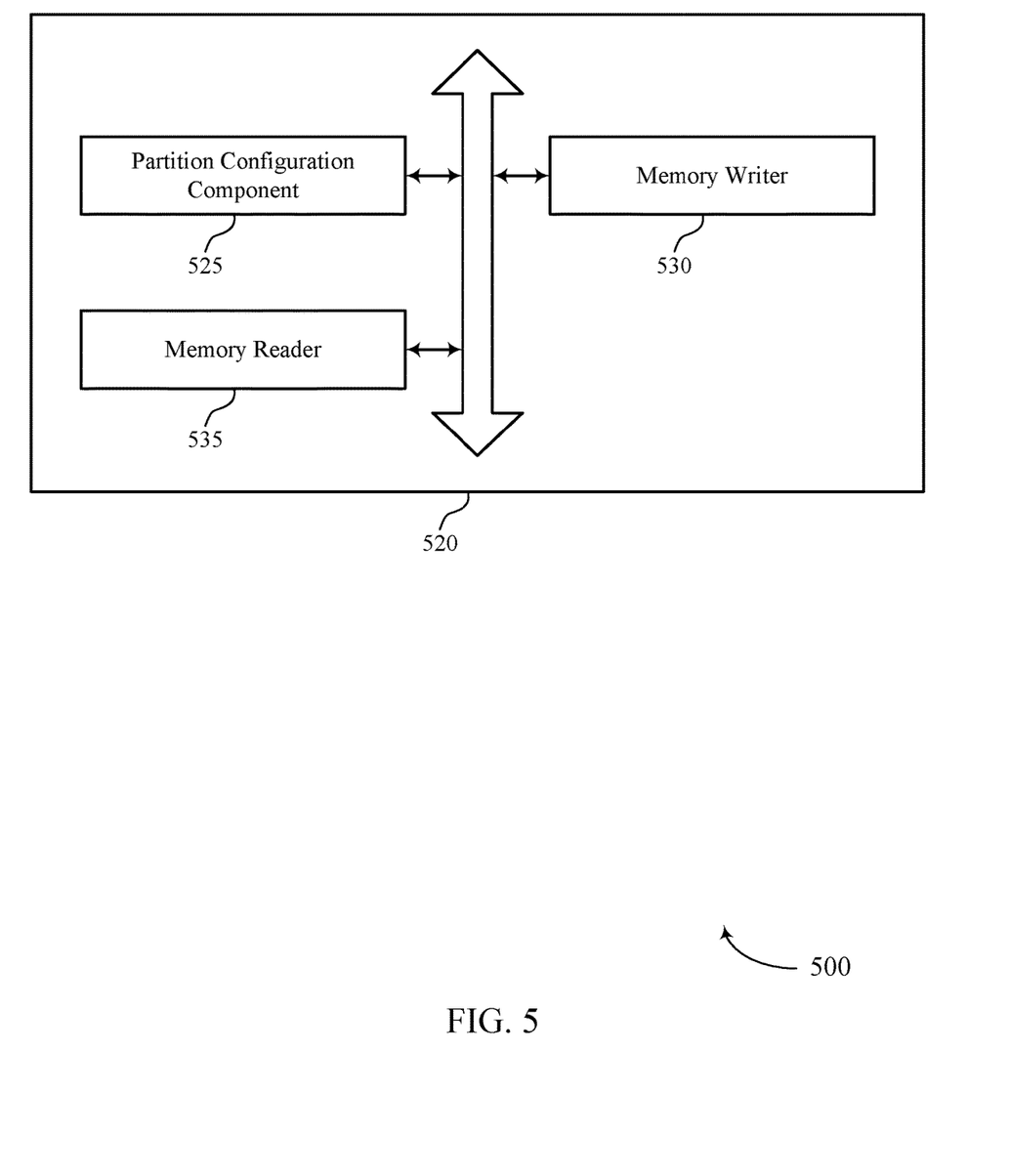
FIG. 5 shows a block diagram of a memory system that supports secure self-purging memory partitions in accordance with examples as disclosed herein.

FIG. 5 shows a block diagram 500 of a memory system 520 that supports secure self-purging memory partitions in accordance with examples as disclosed herein. The memory system 520 may be an example of aspects of a memory system as described with reference to FIGS. 1 through 4. The memory system 520, or various components thereof, may be an example of means for performing various aspects of secure self-purging memory partitions as described herein. For example, the memory system 520 may include a partition configuration component 525, memory writer 530, a memory reader 535, or any combination thereof. Each of these components may communicate, directly or indirectly, with one another (e.g., via one or more buses).

The partition configuration component 525 may be configured as or otherwise support a means for configuring a first portion of a secure partition of a memory device with a first set of operating parameters for access operations, the secure partition configured to store data for authenticated systems. The partition configuration component 525 may be configured as or otherwise support a means for configuring a second portion of the secure partition with a second set of operating parameters for access operations different than the first set of operating parameters for the first portion of the secure partition. The memory writer 530 may be configured as or otherwise support a means for writing data to the second portion of the secure partition using the second set of operating parameters. The memory writer 530 may be configured as or otherwise support a means for overwriting the data stored in the second portion of the secure partition based at least in part on using the second set of operating parameters to write the data.

In some examples, to support overwriting the data, the memory writer 530 may be configured as or otherwise support a means for writing second data to the second portion of the secure partition to cause each memory cell storing the data to settle at a same voltage distribution.

In some examples, the memory writer 530 may be configured as or otherwise support a means for writing third data to the second portion of the secure partition at a location that stores the data based at least in part on overwriting the data.

In some examples, the memory writer 530 may be configured as or otherwise support a means for writing second data to the first portion of the secure partition, wherein a first logic state is written to the first portion using a first write voltage.

In some examples, to support writing the data to the second portion, the memory writer 530 may be configured as or otherwise support a means for writing the first logic state to the second portion using a second write voltage different than the first write voltage. In some examples, to support writing the second data to the first portion of the secure partition, the memory writer 530 may be configured as or otherwise support a means for writing a second logic state to the first portion using a third write voltage. In some examples, to support writing the data to the second portion, the memory writer 530 may be configured as or otherwise support a means for writing the second logic state to the second portion using the third write voltage.

In some examples, a first voltage distribution for memory cells storing the first logic state in the first portion of the secure partition may be different than a second voltage distribution for memory cells storing the first logic state in the second portion of the secure partition. In some examples, a third voltage distribution for memory cells storing the second logic state in the first portion of the secure partition may be the same as for memory cells storing the second logic state in the second portion of the secure partition.

In some examples, the memory reader 535 may be configured as or otherwise support a means for comparing, as part of a first read operation of the first portion, a first charge of a first memory cell in the first portion with a first read reference voltage. In some examples, the memory reader 535 may be configured as or otherwise support a means for comparing, as part of a second read operation of the second portion, a second charge of a second memory cell in the second portion with a second read reference voltage different than the first read reference voltage.

In some examples, the secure partition may include a replay protected memory block.

In some examples, a first operating parameter of the first set of operating parameters of the first portion of the secure partition may include a first read reference voltage. In some examples, a second operating parameter of the second set of operating parameters of the second portion of the secure partition may include a second read reference voltage that is greater than the first read reference voltage.

In some examples, a first operating parameter of the first set of operating parameters of the first portion of the secure partition may include a first write voltage used to write a first logic state to a memory cell. In some examples, a second operating parameter of the second set of operating parameters of the second portion of the secure partition may include a second write voltage used to write the first logic state to the memory cell and that is different than the first write voltage.

In some examples, the secure partition may include a replay protected memory block. In some examples, a counter may be associated with the secure partition and may be configured to reduce a likelihood of success of a replay attack applied to the data stored in the secure partition.

Figure 6:
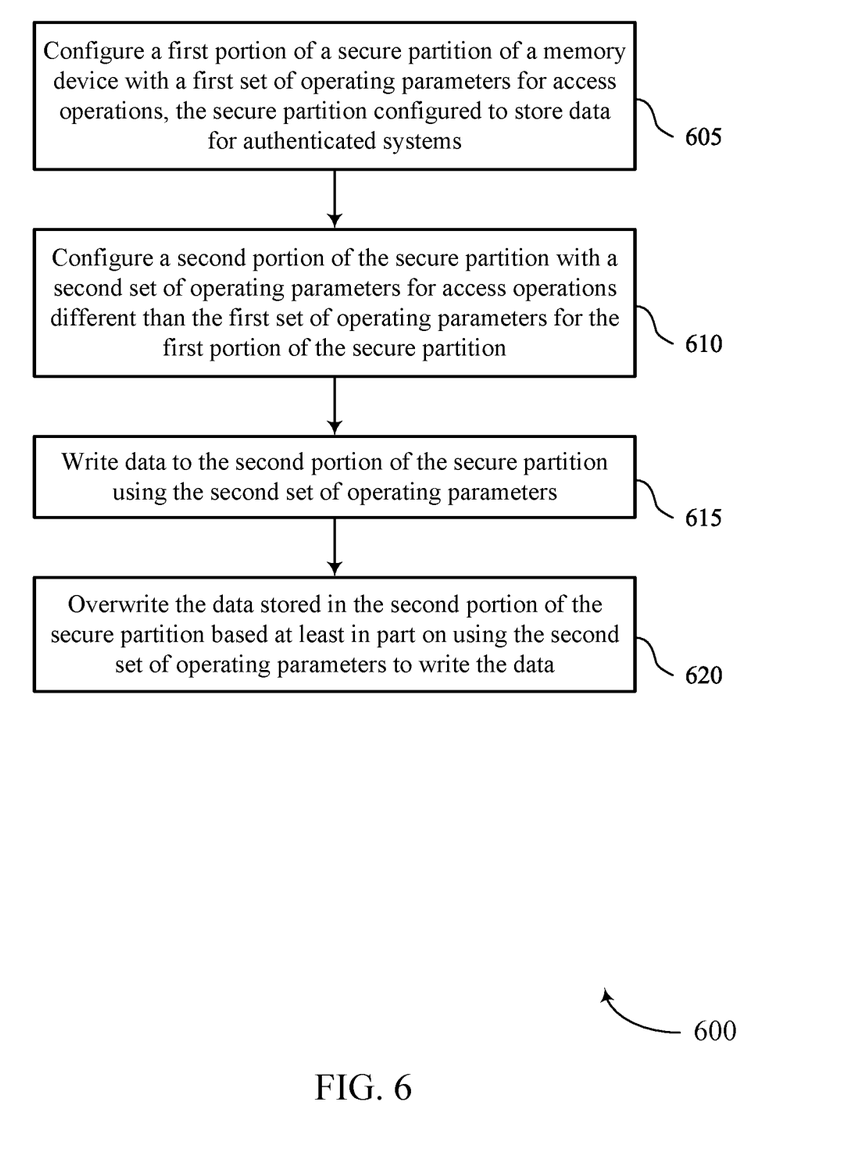
FIG. 6 shows a flowchart illustrating a method or methods that support secure self-purging memory partitions in accordance with examples as disclosed herein.

FIG. 6 shows a flowchart illustrating a method 600 that supports secure self-purging memory partitions in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include configuring a first portion of a secure partition of a memory device with a first set of operating parameters for access operations, the secure partition configured to store data for authenticated systems. The operations of 605 may be performed in accordance with examples as disclosed herein. In some examples, aspects of the operations of 605 may be performed by a partition configuration component 525 as described with reference to FIG. 5.

At 610, the method may include configuring a second portion of the secure partition with a second set of operating parameters for access operations different than the first set of operating parameters for the first portion of the secure partition. The operations of 610 may be performed in accordance with examples as disclosed herein. In some examples, aspects of the operations of 610 may be performed by a partition configuration component 525 as described with reference to FIG. 5.

At 615, the method may include writing data to the second portion of the secure partition using the second set of operating parameters. The operations of 615 may be performed in accordance with examples as disclosed herein. In some examples, aspects of the operations of 615 may be performed by a memory writer 530 as described with reference to FIG. 5.

At 620, the method may include overwriting the data stored in the second portion of the secure partition based at least in part on using the second set of operating parameters to write the data. The operations of 620 may be performed in accordance with examples as disclosed herein. In some examples, aspects of the operations of 620 may be performed by a memory writer 530 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for configuring a first portion of a secure partition of a memory device with a first set of operating parameters for access operations, the secure partition configured to store data for authenticated systems, configuring a second portion of the secure partition with a second set of operating parameters for access operations different than the first set of operating parameters for the first portion of the secure partition, writing data to the second portion of the secure partition using the second set of operating parameters, and overwriting the data stored in the second portion of the secure partition based at least in part on using the second set of operating parameters to write the data.

In some examples of the method 600 and the apparatus described herein, overwriting the data may include operations, features, circuitry, logic, means, or instructions for writing second data to the second portion of the secure partition to cause each memory cell storing the data to settle at a same voltage distribution.

Some examples of the method 600 and the apparatus described herein may further include operations, features, circuitry, logic, means, or instructions for writing third data to the second portion of the secure partition at a location that stores the data based at least in part on overwriting the data.

Some examples of the method 600 and the apparatus described herein may further include operations, features, circuitry, logic, means, or instructions for writing second data to the first portion of the secure partition, where a first logic state may be written to the first portion using a first write voltage.

In some examples of the method 600 and the apparatus described herein, writing the data to the second portion may include operations, features, circuitry, logic, means, or instructions for writing the first logic state to the second portion using a second write voltage different than the first write voltage.

In some examples of the method 600 and the apparatus described herein, a first voltage distribution for memory cells storing the first logic state in the first portion of the secure partition may be different than a second voltage distribution for memory cells storing the first logic state in the second portion of the secure partition.

In some examples of the method 600 and the apparatus described herein, writing the second data to the first portion of the secure partition may include operations, features, circuitry, logic, means, or instructions for writing a second logic state to the first portion using a third write voltage and where writing the data to the second portion includes.

In some examples of the method 600 and the apparatus described herein, a third voltage distribution for memory cells storing the second logic state in the first portion of the secure partition may be the same as for memory cells storing the second logic state in the second portion of the secure partition.

Some examples of the method 600 and the apparatus described herein may further include operations, features, circuitry, logic, means, or instructions for comparing, as part of a first read operation of the first portion, a first charge of a first memory cell in the first portion with a first read reference voltage and comparing, as part of a second read operation of the second portion, a second charge of a second memory cell in the second portion with a second read reference voltage different than the first read reference voltage.

In some examples of the method 600 and the apparatus described herein, the secure partition includes a replay protected memory block.

In some examples of the method 600 and the apparatus described herein, and the method, apparatuses, and non-transitory computer-readable medium may include further operations, features, circuitry, logic, means, or instructions for where a second operating parameter of the second set of operating parameters of the second portion of the secure partition includes a second read reference voltage that may be greater than the first read reference voltage.

In some examples of the method 600 and the apparatus described herein, and the method, apparatuses, and non-transitory computer-readable medium may include further operations, features, circuitry, logic, means, or instructions for where a second operating parameter of the second set of operating parameters of the second portion of the secure partition includes a second write voltage used to write the first logic state to the memory cell and that may be different than the first write voltage.

In some examples of the method 600 and the apparatus described herein, a counter may be associated with the secure partition and may be configured to reduce a likelihood of success of a replay attack applied to the data stored in the secure partition.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

Additionally, the terms "directly in response to" or "in direct response to" may refer to one condition or action occurring as a direct result of a previous condition or action. In some examples, a first condition or action may be performed, and a second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily doped, e.g., degenerate, semiconductor region. The source and drain may be separated by a lightly doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   configuring a first portion of a secure partition of a memory device with a first set of operating parameters for access operations, the secure partition configured to store data for authenticated systems;
   configuring a second portion of the secure partition with a second set of operating parameters for access operations different than the first set of operating parameters for the first portion of the secure partition;
   writing data to the second portion of the secure partition using the second set of operating parameters; and
   overwriting the data stored in the second portion of the secure partition based at least in part on using the second set of operating parameters to write the data.

2. The method of claim 1, wherein overwriting the data further comprises:
   writing second data to the second portion of the secure partition to cause each memory cell storing the data to settle at a same voltage distribution.

3. The method of claim 1, further comprising:
   writing third data to the second portion of the secure partition at a location that stores the data based at least in part on overwriting the data.

4. The method of claim 1, further comprising:
   writing second data to the first portion of the secure partition, wherein a first logic state is written to the first portion using a first write voltage, and
   wherein writing the data to the second portion comprises:
      writing the first logic state to the second portion using a second write voltage different than the first write voltage.

5. The method of claim 4, wherein a first voltage distribution for memory cells storing the first logic state in the first portion of the secure partition is different than a second voltage distribution for memory cells storing the first logic state in the second portion of the secure partition.

6. The method of claim 4, wherein writing the second data to the first portion of the secure partition comprises:
   writing a second logic state to the first portion using a third write voltage; and
   wherein writing the data to the second portion comprises:
      writing the second logic state to the second portion using the third write voltage.

7. The method of claim 6, wherein a third voltage distribution for memory cells storing the second logic state in the first portion of the secure partition is the same as for memory cells storing the second logic state in the second portion of the secure partition.

8. The method of claim 1, further comprising:
comparing, as part of a first read operation of the first portion, a first charge of a first memory cell in the first portion with a first read reference voltage; and
comparing, as part of a second read operation of the second portion, a second charge of a second memory cell in the second portion with a second read reference voltage different than the first read reference voltage.

9. The method of claim 1, wherein the secure partition comprises a replay protected memory block.

10. The method of claim 1, wherein a first operating parameter of the first set of operating parameters of the first portion of the secure partition comprises a first read reference voltage; and
wherein a second operating parameter of the second set of operating parameters of the second portion of the secure partition comprises a second read reference voltage that is greater than the first read reference voltage.

11. The method of claim 1, wherein a first operating parameter of the first set of operating parameters of the first portion of the secure partition comprises a first write voltage used to write a first logic state to a memory cell; and
wherein a second operating parameter of the second set of operating parameters of the second portion of the secure partition comprises a second write voltage used to write the first logic state to the memory cell and that is different than the first write voltage.

12. The method of claim 1, wherein a counter is associated with the secure partition and is configured to reduce a likelihood of success of a replay attack applied to the data stored in the secure partition.

13. An apparatus, comprising:
a memory device having a secure partition configured to store information for authenticated systems, wherein the secure partition comprises:
a first portion configured to store a first set of operating parameters for access operations; and
a second portion configured to store a second set of operating parameters for access operations; and
the apparatus further comprising: a controller associated with the memory device, wherein the controller is configured to cause the apparatus to:
write data to the second portion of the secure partition of the memory device using the second set of operating parameters; and
overwrite the data stored in the second portion of the secure partition of the memory device based at least in part on using the second set of operating parameters to write the data.

14. The apparatus of claim 13, wherein the controller is further configured to cause the apparatus to:
write second data to the second portion of the secure partition of the memory device to cause each memory cell storing the data to settle at a same voltage distribution.

15. The apparatus of claim 13, wherein the controller is further configured to cause the apparatus to:
write third data to the second portion of the secure partition at a location that stores the data based at least in part on overwriting the data.

16. The apparatus of claim 13, wherein the controller is further configured to cause the apparatus to:
write second data to the first portion of the secure partition, wherein to write the second data to the first portion of the secure partition, the controller is further configured to cause the apparatus to write a first logic state to the first portion using a first write voltage, and
wherein to write the data to the second portion of the secure partition, the controller is further configured to cause the apparatus to write the first logic state to the second portion using a second write voltage different than the first write voltage.

17. The apparatus of claim 13, wherein the controller is further configured to cause the apparatus to:
compare, as part of a first read operation of the first portion, a first charge of a first memory cell in the first portion with a first read reference voltage; and
compare, as part of a second read operation of the second portion, a second charge of a second memory cell in the second portion with a second read reference voltage different than the first read reference voltage.

18. The apparatus of claim 13, wherein:
a first operating parameter of the first set of operating parameters of the first portion of the secure partition comprises a first read reference voltage; and
a second operating parameter of the second set of operating parameters of the second portion of the secure partition comprises a second read reference voltage that is greater than the first read reference voltage.

19. The apparatus of claim 13, wherein:
a first operating parameter of the first set of operating parameters of the first portion of the secure partition comprises a first write voltage used to write a first logic state to a memory cell; and
a second operating parameter of the second set of operating parameters of the second portion of the secure partition comprises a second write voltage used to write the first logic state to the memory cell and that is different than the first write voltage.

20. A non-transitory computer-readable medium storing code, the code comprising instructions executable by a processor to:
configure a first portion of a secure partition of a memory device with a first set of operating parameters for access operations, the secure partition configured to store data for authenticated systems;
configure a second portion of the secure partition with a second set of operating parameters for access operations different than the first set of operating parameters for the first portion of the secure partition;
write data to the second portion of the secure partition using the second set of operating parameters; and
overwrite the data stored in the second portion of the secure partition based at least in part on using the second set of operating parameters to write the data.

21. The non-transitory computer-readable medium of claim 20, wherein the instructions are further executable by the processor to:
write second data to the second portion of the secure partition of the memory device to cause each memory cell storing the data to settle at a same voltage distribution.

22. The non-transitory computer-readable medium of claim 20, wherein the instructions are further executable by the processor to:

write third data to the second portion of the secure partition at a location that stores the data based at least in part on overwriting the data.

23. The non-transitory computer-readable medium of claim 20, wherein the instructions are further executable by the processor to:
write second data to the first portion of the secure partition, wherein to write the second data to the first portion of the secure partition, the instructions are further executable by the processor to write a first logic state to the first portion using a first write voltage, and
wherein to write the data to the second portion of the secure partition, the instructions are further executable by the processor to write the first logic state to the second portion using a second write voltage different than the first write voltage.

24. The non-transitory computer-readable medium of claim 23, wherein a first voltage distribution for memory cells storing the first logic state in the first portion of the secure partition is different than a second voltage distribution for memory cells storing the first logic state in the second portion of the secure partition.

25. The non-transitory computer-readable medium of claim 20, wherein the instructions are further executable by the processor to:
compare, as part of a first read operation of the first portion, a first charge of a first memory cell in the first portion with a first read reference voltage; and
compare, as part of a second read operation of the second portion, a second charge of a second memory cell in the second portion with a second read reference voltage different than the first read reference voltage.

* * * * *